July 25, 1961 W. R. KARKOSKA 2,993,237
COTTON CLEANING APPARATUS
Filed April 15, 1960 2 Sheets-Sheet 1
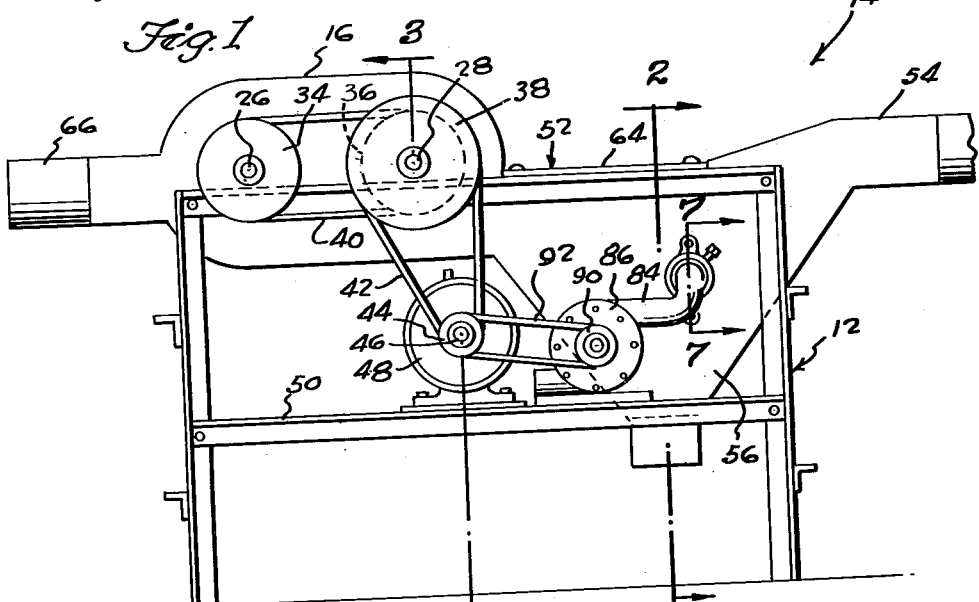
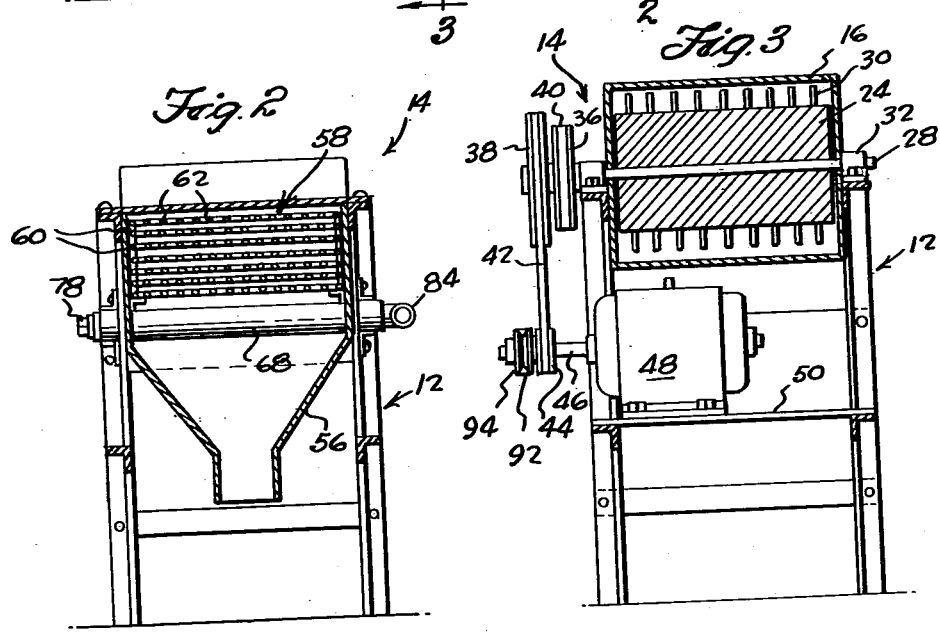
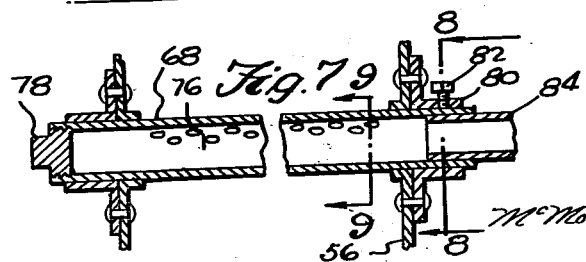
INVENTOR.
Willie R. Karkoska
BY
McMorrow, Berman + Davidson
ATTORNEYS

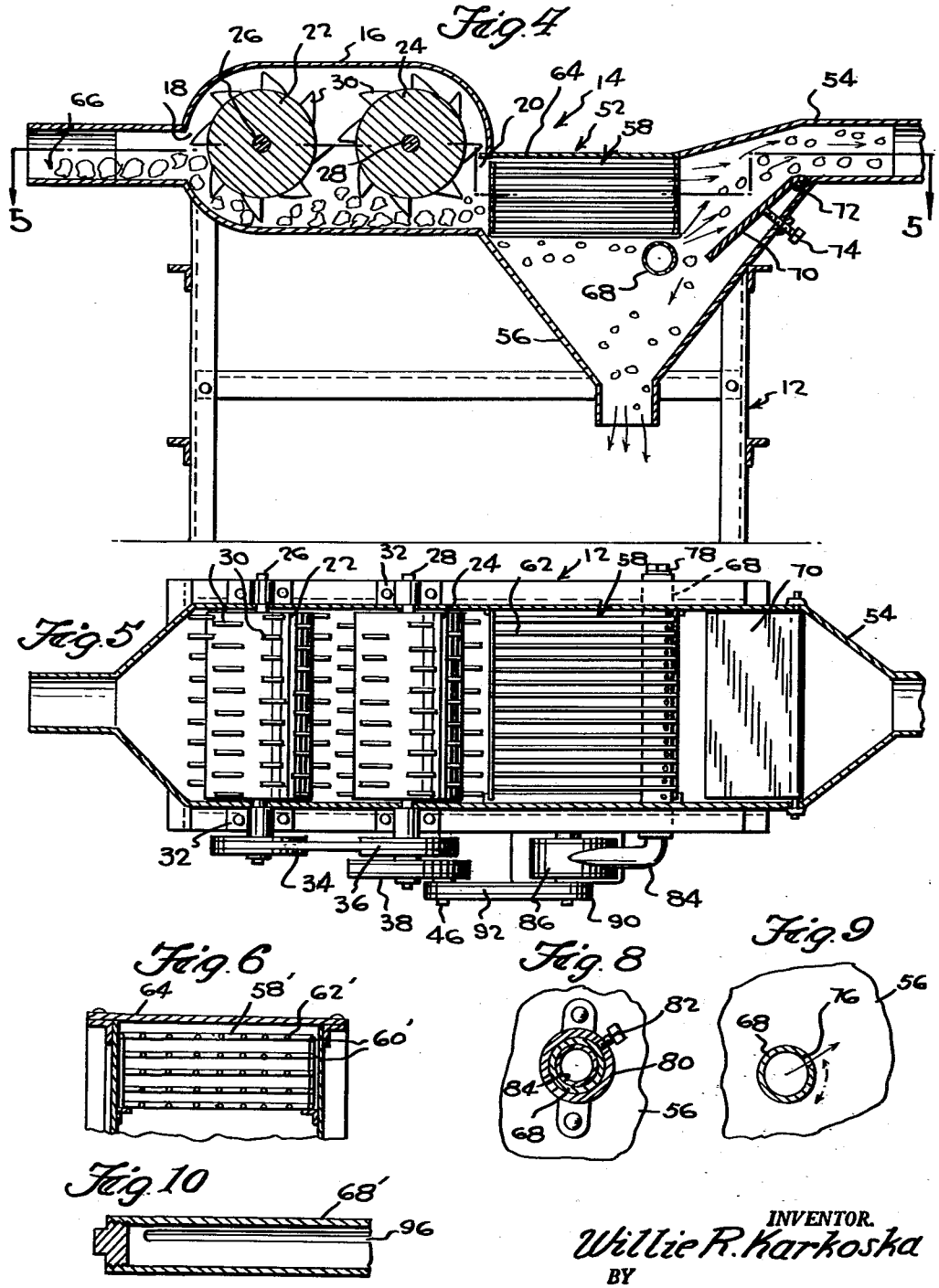

2,993,237
COTTON CLEANING APPARATUS
Willie Rudolph Karkoska, Rte. 2, Bay City, Tex.
Filed Apr. 15, 1960, Ser. No. 22,560
4 Claims. (Cl. 19—38)

The present invention relates to an apparatus for extracting or cleaning cotton from cotton bolls and associated trash.

In the cotton ginning industry, it is frequently advantageous to treat the cotton bolls prior to ginning so as to extract the cotton from the bolls and to separate the cotton from the trash such as stones or other debris which is gathered by the cotton picking machines presently in use. The amount of trash in a given quantity of cotton bolls varies from one field to another field, from one locality to another locality and not every cotton cleaning apparatus that has been proposed or is presently in use operates efficiently in each locality.

An object of the present invention is to provide a cotton cleaning apparatus which lends itself to use in all cotton producing localities, one which removes with optimum efficiency the trash associated with the cotton bolls while breaking the bolls from the cotton and separating the cotton from the bolls and trash, and one which lends itself to ready adjustment for cotton bolls with varied assortments of trash contained therein.

Another object of the present invention is to provide a cotton cleaning apparatus which separates the cotton from the bolls after the bolls have broken, one which recovers all of the cotton contained within the bolls, and one which is economically feasible.

A further object of the present invention is to provide a cotton cleaning or extracting apparatus which is simple in structure, one having few parts which require little or no maintenance after installation, one which may be manufactured in quantity at reasonable cost, and one which is highly effective in action.

These and other objects and advantages of the present invention will be fully apparent from the following description when taken in conjunction with the annexed drawings, in which:

FIGURE 1 is a side elevational view of the apparatus according to the present invention;

FIGURE 2 is a view taken on the line 2—2 of FIGURE 1;

FIGURE 3 is a view taken generally on the line 3—3 of FIGURE 1;

FIGURE 4 is an elevational view in section of the apparatus;

FIGURE 5 is a view taken on the line 5—5 of FIGURE 4;

FIGURE 6 is a fragmentary sectional view showing a modified form of the separator element employed in the apparatus of the present invention;

FIGURE 7 is a view on an enlarged scale with a portion in the midsection broken away, taken on the line 7—7 of FIGURE 1;

FIGURE 8 is a view taken on the line 8—8 of FIGURE 7;

FIGURE 9 is a view taken on the line 9—9 of FIGURE 7; and

FIGURE 10 is a fragmentary view in section of the blast forming conduit, a portion of the blast forming conduit being broken away, according to a modified form of the invention.

Referring in greater detail to the drawings in which like numerals indicate like parts throughout the several views, in FIGURES 1 to 5, the reference numeral 12 designates generally an upstanding frame on which the apparatus 14 of the present invention is supported. The apparatus comprises a closed housing 16 having an inlet 18 and an outlet 20.

At least two drums 22 and 24 are arranged in tandem spaced relation within the housing 16 and each is rotatable in the counterclockwise direction about its shaft 26 and 28, respectively, constituting horizontal axes.

Each of the drums 22 and 24 has a plurality of blades 30 projecting from the external peripheral surface thereof, the blades 30 being in staggered relation, as shown most clearly in FIGURE 5.

Each of the shafts 26 and 28 is journaled in a pair of bearing blocks 32 carried by the frame 12 and adjacent ends of the shafts 26 and 28 carry pulleys 34 and 36, respectively.

The shaft 28 also carries another pulley 38 exteriorly of the pulley 36. A belt 40 connects the pulleys 34 and 36 together and a belt 42 connects the pulley 38 to the drive pulley 44 on the motor shaft 46 of an electric motor 48. The motor 48 is mounted upon a shelf 50 carried by the frame 12.

A casing 52 is positioned in side by side relation with respect to the housing 16 and has one end connected in communication with the outlet 20 of the housing 16.

A tunnel member 54 projects longitudinally from the other end of the casing 52 and a sump 56 depends from the casing 52.

A horizontally disposed separator assembly 58 is positioned within the casing 52 with one end in communication with the outlet 20 of the housing 16 and the other end facing and spaced from and connected in communication with the tunnel member 54.

The assembly 58 embodies a plurality of layers 60 arranged in superimposed relation, each layer 60 including a plurality of bars 62 arranged in spaced relation, the bars 62 of the respective layers being in registry with each other.

A cover 64 extends over the open upper end of the casing 52 and makes possible the removal of the separator assembly 58 as a unit and replacement with another assembly when desired.

A conduit 66 has one end connected to the inlet 18 of the housing 16 for introducing cotton bolls and associated stones and debris through the inlet 18 into the housing 16. The other end of the conduit 66 is adapted to be connected to a source of cotton bolls mixed with stones, debris, or other trash.

A pipe 68, constituting pneumatic means, is positioned transversely of the casing 52 below and adjacent the separator assembly 58 and is operable to direct a stream or blast of air toward the tunnel member 54.

Means is provided by the present invention for forming a throat in the portion of the casing 52 adjacent the tunnel member 54 and intermediate the one end of the separator assembly 58 and the tunnel member 54 for controlling the volume of air flowing into the tunnel member 54. This throat-forming means consists in a plate 70 connected by a hinge 72 to the tunnel member 54 on the bottom of the latter. A bolt 74 is threadedly engaged in one wall of the sump 56 and has its free end bearing against the underside of the plate 70 for moving the plate 70 toward and away from the adjacent end of the separator assembly 58.

As shown most clearly in FIGURE 7, the pipe 68 is provided with a plurality of spaced holes 76 which face toward the throat of the tunnel member 54. One end of the pipe 68 is closed by a plug 78 and the other end of the pipe 68 is supported in a collar 80 which is secured to one wall of the sump 56. A set screw 82 extends through the collar 80 and is used to secure the pipe 68 in any position of its adjusted rotary movement in the collar 80. A conduit 84 connects the adjacent end of the pipe 68 to the output side of a blower 86. The blower 86 has a rotatable shaft 88 carrying a pulley 90 exteriorly of the blower 86. The pulley 90 is connected by a belt 92 to another pulley 94 carried on the motor shaft 46 adjacent the pulley 44.

In operation, the lower discharge end of the sump 56 is closed by connection to a closed receptacle (not shown) or by other conventional means so that air may not be admitted upwardly into the sump 56 in response to the suction created by air flowing out of the pipe 68 toward the tunnel member 54.

Upon energization of the motor 48, the drums 22 and 24 are rotated in the counterclockwise direction so that the blades 30 engage and break the bolls of cotton bolls admitted through the conduit 66 into the housing 16. Sufficient suction is created by the jet of air emitted from the pipe 68 to draw the cotton bolls into the housing 16 from the conduit 66.

The drums 22 and 24, constituting boll breaking means, drive the broken bolls, rocks, debris, and other trash toward the one end of the assembly 58. The suction in the tunnel member 54 draws the cotton through the separator assembly 58 with the rocks, stones, debris and broken bolls falling into the sump 56 for discharge out of the lower end of the latter. The air blast carries the cotton outwardly of the tunnel member 54 to a place of storage or use.

Adjustment of the plate 70 upwardly or downwardly varies the aperture through which the air blast enters the tunnel member 54 and thereby varies the suction which acts upon the cotton entering the housing 16 and entering the one end of the separator assembly 58 adjacent the housing 16.

The cover 64 on the separator assembly 58 may be removed so that another separator assembly 58', as shown in FIGURE 6, may be inserted therein, the layers 60' of bars 62' being spaced differently than from the bars and layers of the assembly 58.

In FIGURE 10, a modified form of the pipe 68 is shown and designated by the reference numeral 68'. In this form of the pipe, the holes are omitted and a slot 96 is provided extending from points inwardly of the ends of the pipe 68'. The slot 96 serves to eject the blast of air toward the tunnel member 54 when the pipe 68' is substituted for the pipe 68.

What is claimed is:

1. In an apparatus for extracting cotton from the bolls and associated stones and debris, a closed housing having an inlet and an outlet in opposed relation, boll breaking means in said housing, a casing positioned in side by side relation with respect to said housing and connected in communication with the outlet of said hosuing, a tunnel member projecting longitudinally from said casing, a sump depending from said casing, a horizontally disposed separator assembly positioned within said casing and having one end in communication with the outlet of said housing and having the other end in communication with said tunnel member, said separator assembly embodying a plurality of layers arranged in superimposed relation, each layer including a plurality of bars arranged in spaced relation, a conduit connected to the inlet of said housing for introducing bolls and associated stones and debris through the inlet into said housing, and pnuematic means positioned below and adjacent said separator assembly and operable to direct a stream of air toward said tunnel member for causing the bolls and associated stones and debris introduced through said conduit to travel through said housing, be impinged upon said boll breaking means to remove the bolls from the cotton, and be ejected upon said bars and cause the stones, bolls, and debris to fall into the sump and the cotton to flow into said tunnel member.

2. In an apparatus for extracting cotton from the bolls and associated stones and debris, a closed housing having an inlet and an outlet in opposed relation, at least two drums arranged in tandem spaced relation and each rotatable in a counterclockwise direction about a horizontal axis positioned within said housing, each of said drums having a plurality of blades projecting from the external peripheral surface thereof, a casing positioned in side by side relation with respect to said housing and connected in communication with the outlet of said housing, a tunnel member projecting longitudinally from said casing, a sump depending from said casing, a horizontally disposed separator assembly positioned within said casing and having one end in communication with the outlet of said housing and having the other end in communication with said tunnel member, said separator assembly embodying a plurality of layers arranged in superimposed relation, each layer including a plurality of bars arranged in spaced relation, a conduit connected to the inlet of said housing for introducing bolls and associated stones and debris through the inlet into said housing, and pneumatic means positioned below and adjacent said separator assembly and operable to direct a stream of air toward said tunnel member for causing the bolls and associated stones and debris introduced through said conduit to travel through said housing, be impinged upon by the blades of said drums to remove the bolls from the cotton, and be ejected upon said separator assembly and cause the stones, bolls, and debris to fall into the sump and the cotton to flow into said tunnel member.

3. In an apparatus for extracting cotton from the bolls and associated stones and debris, a closed housing having an inlet and an outlet in opposed relation, at least two drums arranged in tandem spaced relation and each rotatable in a counterclockwise direction about a horizontal axis positioned within said housing, each of said drums having a plurality of blades projecting from the external peripheral surface thereof, a casing positioned in side by side relation with respect to said housing and connected in communication with the outlet of said housing, a tunnel member projecting longitudinally from said casing, a sump depending from said casing, a horizontally disposed separator assembly positioned within said casing and having one end in communication with the outlet of said housing and having the other end in communication with said tunnel member, said separator assembly embodying a plurality of layers arranged in superimposed relation, each layer including a plurality of bars arranged in spaced relation, the bars of the respective layers being in registry with each other, a conduit connected to the inlet of said housing for introducing bolls and associated stones and debris through the inlet into said housing, and pneumatic means positioned below and adjacent said separator assembly and operable to direct a stream of air toward said tunnel member for causing the bolls and associated stones and debris introduced through said conduit to travel through said housing, be impinged upon by the blades of said drums to remove the bolls from the cotton, and be ejected upon said separator assembly and cause the stones, bolls, and debris to fall into the sump and the cotton to flow into said tunnel member.

4. In an apparatus for extracting cotton from the bolls and associated stones and debris, a closed housing having an inlet and an outlet in opposed relation, at least two drums arranged in tandem spaced relation and each rotatable in a counterclockwise direction about a horizontal axis positioned within said housing, each of said drums having a plurality of blades projecting from the external peripheral surface thereof, a casing positioned in side by side relation with respect to said housing and connected in communication with the outlet of said housing, a tunnel member projecting longitudinally from said casing, a sump depending from said casing, a horizontally disposed separator assembly positioned within said casing and having one end in communication with the outlet of said housing and having the other end in communication with said tunnel member, throat forming means in the portion of said casing intermediate the other end of said separator assembly and said tunnel member for controlling the volume of air flowing into said tunnel member, a conduit connected to the inlet of said housing for introducing bolls and associated stones and debris through the inlet into said housing, and pneumatic means positioned below and adjacent said separator assembly and operable to direct a stream of air toward said tunnel member for causing the bolls and associated stones and debris introduced through said conduit to travel through said housing, be impinged upon by the blades of said drums to remove the bolls from the cotton, and be ejected upon said separator assembly and cause the stones, bolls, and debris to fall into the sump and the cotton to flow into said tunnel member.

References Cited in the file of this patent

UNITED STATES PATENTS

| | | |
|---|---|---|
| 884,671 | Lamb | Apr. 14, 1908 |
| 1,680,978 | Garner | Aug. 14, 1928 |
| 2,635,296 | Yeager | Apr. 21, 1953 |